March 24, 1942.    W. SUHNER    2,277,614
CHANGE SPEED GEAR
Filed Nov. 1, 1939
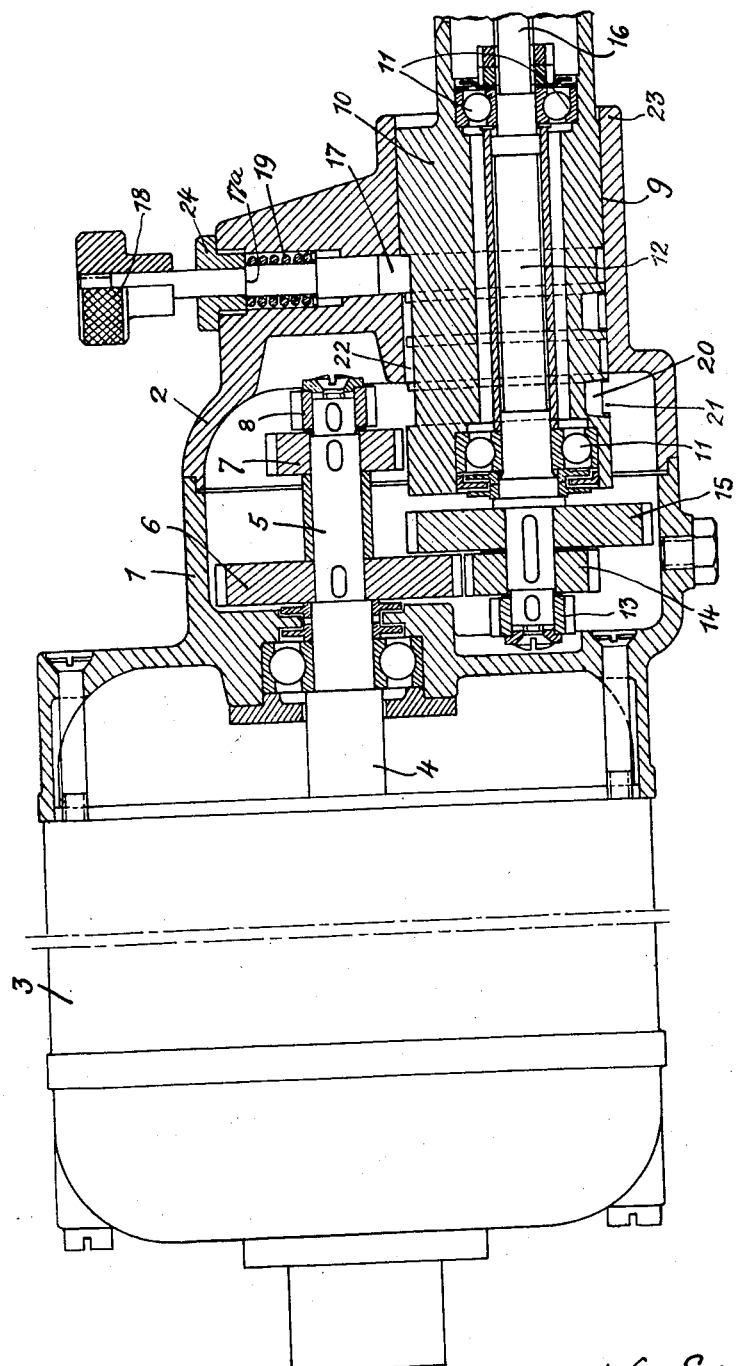
Inventor,
W. Suhner
by: Glascock Downing & Seebold
Attys.

Patented Mar. 24, 1942

2,277,614

UNITED STATES PATENT OFFICE 2,277,614

CHANGE SPEED GEAR

Willy Suhner, Brugg, Switzerland

Application November 1, 1939, Serial No. 302,457
In Switzerland November 8, 1938

7 Claims. (Cl. 74—342)

The present invention refers to a change-speed-gear comprising toothed wheels arranged on a driving and on a driven shaft and adapted to be brought to engagement in couples.

The invention consists especially in a flanged gear that is a gear placed on the shield of the mother-bearing.

On gearings of this kind their building offers difficulties increasing with a greater number of gearings because the means for displacing the various sets of wheels and for coupling them one with another become complicated and mostly require a plurality of operating levers, slide-keys, intermediate wheels and the like. These elements make dearer the gear and increase the dimensions and weights thereof what is disadvantageous especially on portable electric machines provided with change-speed gear.

On the change-speed-gear according to the present invention one shaft of the gear is eccentrically supported in a sleeve which can be rotated and displaced in axial direction within the bore of the gear casing, the arrangement being such that the toothed wheels placed on the other shaft can be brought in engagement with that on the first mentioned shaft two by two by rotating and displacing said sleeve.

On the accompanying drawing a constructional example of the invention is illustrated in an axially sectional view. The gear shown is a flanged gear with a casing 1, 2 the part 1 of which is at the same time a bearing flange of the driving motor 3.

On that end 5 of the motor shaft 4 which extends into the gear casing three toothed wheels 6, 7, 8 of different diameters are mounted. In the bore of the casing portion 2 a sleeve 10 is rotatably mounted and adapted to be displaced in axial direction. On ball-bearings 11 in this sleeve 10 a shaft 12 is rotatably supported which on that of its ends which extends into the gear-casing has mounted thereon three toothed wheels 13, 14 and 15. The axis of the sleeve 10 and of the shaft 12 are parallel one to another, the shaft 12 being disposed however eccentrically relatively to the axis of the sleeve. The outer extremity of the shaft 12 has a threaded portion 16 for the connection with a flexible shaft, for instance for the driving of grindstones and so on.

As the sleeve 10 is rotatably mounted and adapted to be displaced, the wheels 13 or 14 can be brought into engagement with the wheel 6, or the wheel 15 be caused to gear with the wheels 7 or 8. For securing the sleeve 10 in the various positions of engagement a bolt 17 is provided which can be drawn out of recesses 20 on the circumference of the sleeve 10 by means of a button 18 against the action of a spring 19. The recesses 20 are provided on the base of grooves 21 on the circumference of the sleeve 10. A groove 22 extending parallelly to the axis allows the sleeve to be displaced in axial direction whereby the bolt 17 can be brought from one of the grooves 21 into the other. The way which can be made by the bolt 17 is measured so as to prevent this bolt from being removed out of the grooves 21, misconnections are therefore made impossible.

The tubelike extremity or hub of the casing portion 2 is provided with a division-line in front of which division-lines and indications on the circumference of the sleeve 10 are adjustable. The indications give the number of revolutions of the shaft 12 corresponding with the position of the sleeve for the individual engagements of the wheels.

The change speed gear can be built for more than four speed stages, as illustrated. Instead of in the form of a flange gear, as shown, the change-speed-gear according to the present invention can be constructed in such a manner that the shaft 5 is the driven one and the shaft 16 the motor shaft whereat the motor is displaced in the direction of its axis and parallely thereto when the number of revolutions is altered. In this case the driven shaft rests stationary so that for instance the driving of machine-tools can be performed.

What I claim is:

1. In a change-speed-gear, a driving shaft and a driven shaft parallel one to another, at least three toothed wheels of different diameters mounted on each of these shafts, a rotatable sleeve forming bearings for one of said shafts and adapted to be displaced in axial direction, said shaft being eccentrically supported in this sleeve in such a way that by displacing and partially rotating said sleeve the largest wheel on each of said shafts can be brought alternatively into engagement with two of the smaller wheels on the other shafts, circumferential grooves being provided on the sleeve, a fixing means adapted to engage alternatively with said circumferential grooves to secure the sleeve in position.

2. In a change-speed-gear as claimed in claim 1, a recess on the bottom of each of the circumferential grooves of the sleeve, a spring loaded bolt adapted to make a limited movement in radial direction relatively to said sleeve and to alternatively be brought in engagement with said recesses, another groove on the circumference of the sleeve connecting the circumferential grooves in axial direction of the sleeve.

3. In a change-speed gear, parallel driving and driven shafts, toothed wheels on said shafts, a sleeve constituting a bearing for one of said shafts and mounted for axial displacement whereby, on one hand one toothed wheel of said shaft may be aligned with either of two toothed wheels on the other shaft and, on the other hand, a third toothed wheel on the second mentioned shaft may be aligned with either of two other toothed wheels on the first mentioned shaft and means whereby the shafts may be radially displaced with relation to each other to bring the aligned gear wheels into mesh.

4. A change speed gear as claimed in claim 3 characterized by the provision of means for releasably retaining the gears in the various meshing relations.

5. In a change-speed gear, a driving shaft and a driven shaft, parallel with one another and adapted to be displaced relatively to one another in axial and radial directions, an equal number of toothed wheels of different diameter directly mounted and fixed on each of said shafts in such position relatively one to another and to the wheels on the other shaft that one of the wheels on each shaft can be brought into engagement alternatively with two wheels of different diameter on the other shaft so as to afford a number of different speeds of the driven shaft greater than the number of toothed wheels on each of said shafts.

6. In a change-speed gear, a driving shaft and a driven shaft, parallel with one another, and adapted to be displaced relatively to one another in radial and axial directions, at least three toothed wheels of different diameters mounted on each of these shafts in such position relatively one to another and to the wheels on the other shaft that the largest wheel on each of said shafts can alternatively be brought into engagement with two of the smaller toothed wheels on the other shaft whereby the driven shaft may be driven alternatively at different higher or lower speeds than the driving shaft is rotated.

7. In a change-speed gear, a driving shaft and a driven shaft, parallel with one another, a plurality of toothed wheels on each of these shafts, a sleeve forming a bearing for one of said shafts and adapted to be displaced in axial direction and to be rotated eccentrically with respect to the shaft supported therein, said toothed wheels being placed on one shaft in such position relatively to that on the other shaft that by partially rotating and axially displacing said sleeve engagement can be effected alternatively between the largest of said toothed wheels on each of said shafts with one or the other of the smaller wheels on the other shaft so that the number of different speeds obtainable is greater than the number of toothed wheels on each of said shafts.

WILLY SUHNER.